United States Patent [19]
Brandon

[11] Patent Number: 5,381,814
[45] Date of Patent: Jan. 17, 1995

[54] CANOPY FOR MOUNTING ON A VEHICLE LUGGAGE RACK

[76] Inventor: Steven L. Brandon, 15530 Ella Blvd., Apt. 1422, Houston, Tex. 77090

[21] Appl. No.: 983,639

[22] Filed: Dec. 1, 1992

[51] Int. Cl.[6] .......................................... E04H 15/06
[52] U.S. Cl. ................................ 135/88.07; 160/22; 160/68
[58] Field of Search ..................... 135/89, 88; 160/22, 160/70, 66, 67, 68, 70, 310, 23.1, 45, 48

[56] References Cited

U.S. PATENT DOCUMENTS

| | | | |
|---|---|---|---|
| 3,327,724 | 6/1967 | Nielsen | 135/89 X |
| 3,906,969 | 9/1975 | Myers | 135/89 |
| 4,171,013 | 10/1979 | Clark | 135/89 X |
| 4,188,964 | 2/1980 | Greer | 135/89 |
| 4,726,153 | 2/1988 | Adler et al. | 135/89 X |
| 4,924,895 | 5/1990 | Bailie | 135/89 |

FOREIGN PATENT DOCUMENTS 1380412 1/1975 United Kingdom ................. 135/89

OTHER PUBLICATIONS

NSC Corporation, "Instructions for Self Storing Bag Awning"; Chicago, Ill.

Primary Examiner—Lanna Mai
Attorney, Agent, or Firm—Pravel, Hewitt, Kimball & Krieger

[57] ABSTRACT

A canopy may be mounted on the luggage rack of the vehicle by a pair of brackets. The canopy may be fitted on nearly any luggage rack by adjusting the placement of the brackets. The canopy is enclosed by an enclosure, and rolls up onto a carriage in the enclosure. To erect the canopy, the bag is unzipped, the canopy is extended, and aluminum support posts are extended to support the canopy. The canopy is supported along its sides by a pair of rafters that are similarly extended. The canopy provides shelter and protection when it is needed, and is easily stored in its enclosure for transport.

5 Claims, 2 Drawing Sheets

CANOPY FOR MOUNTING ON A VEHICLE LUGGAGE RACK

BACKGROUND OF THE INVENTION

1. Field of the Invention

The invention relates to accessory equipment for vehicles, and more particularly, to canopies mounted on vehicles.

2. Description of the Related Art

In recent years, minivans and utility vehicles have become popular as recreational and family vehicles. The rugged construction and spacious design makes them ideal for transporting several people as well as supplies and equipment for a holiday or weekend away from the city. Minivans and utility vehicles commonly appear at beaches and campgrounds all over the United States.

For many activities away from the urban environment, a shield from the direct sun is welcome and sometimes even necessary. But shade is often unavailable where it is needed. For example, many vacationers enjoy the beach where the scarcity of vegetation and buildings affords little or no shade. The heat of the direct sun is often uncomfortable, and for those with sensitive skin, exposure to too much sun may even be dangerous. Many beachgoers also bring food and drink, which is best if kept cool and out of the direct sun.

Other activities like camping may require shelter from elements other than the sun. Although trees often provide sufficient shade from the sun while camping, campers may need protection from elements such as rain or hail. Consequently, a shelter is needed to provide protection for equipment, supplies, and even people.

In many of these situations, the only shelter available is provided by the vehicle itself or a temporary structure, like a tent. Although either provides shelter from the sun, a vehicle or tent can become uncomfortably warm due to the windows in the vehicle or the translucence of the tent fabric. Taking refuge in a vehicle is also awkward due to the confined space and the interference of seats, the transmission lever, and various other projections. The confines of the vehicle also generally prevent access to its contents by more than one or two persons at a time, making a vehicle unsuitable for picnics or inclement weather. Furthermore, keeping food and drink in a vehicle is hazardous because grease stains and spills may mar the seats and floor of the vehicle.

Independent structures like tents are equally inaccessible and cramped, and are further difficult to erect and dismantle. Generally, the difficulty associated with raising a tent makes it inappropriate for a day at the beach or an afternoon picnic.

Other potential shelters include beach umbrellas and camper trailers. Although beach umbrellas are easy to use and transport, the shelter provided is extremely limited. Camper trailers are often used by campers and hunters to provide shelter and extra space, but camper trailers are expensive and cumbersome. Towing a camper trailer also complicates driving, and prevents the vehicle from towing other equipment like a boat trailer.

Some camper trailers provide added shelter by including an awning or canopy attached to the top or side of the camper trailer. The design of awnings and canopies varies, including awnings that are supported by props between the end of the awning and the side of the camper trailer, awnings that are opened and braced by turning and locking a crank, and canopies that fold into a case or bag that may be extended from the side of a camper trailer and supported by posts. Each of these offers extra shelter and shade for travelers and supplies. The shelters are generally bolted to the side of the camper trailer or attached by some other permanent means so that the awning or canopy is an integral part of the camper trailer and cannot be easily removed.

Although awnings and canopies effectively provide shade and shelter, they are generally not available without towing the camper trailer. Awnings and canopies are not customarily available for minivans and utility vehicles. This is partially because minivans and utility vehicles generally do not include the structure to permit an awning or canopy to be bolted to the vehicle roof or side. In addition, most owners would be reluctant to permanently bolt an awning or canopy to a vehicle that is only occasionally used for the beach, camping, or other recreational purposes, as the bolts leave permanent holes and mar the exterior and interior of the vehicle. Furthermore, permanently mounting a canopy or awning on a vehicle may detract from the vehicle's aesthetic lines, further discouraging owners from permanently mounting a shelter on the vehicle's top or side.

SUMMARY OF THE PRESENT INVENTION

Briefly, a canopy or awning according to the present invention may be mounted on a minivan or utility vehicle without physically altering the vehicle itself. The canopy is mounted on the luggage rack of the vehicle by a pair of brackets. A carriage is mounted on the brackets. The spacing of the brackets is adjustable to allow the canopy to be fitted to nearly any luggage rack. Before the carriage is connected to the brackets, however, the carriage is placed inside an enclosure having a zippered opening. The enclosure also contains a canopy, which is connected along one edge to the enclosure and rolls up onto the carriage and into the enclosure. To erect the canopy, the bag is unzipped and the canopy is unfurled. The canopy is supported at its outer edge by a pair of support poles at the corners, and aluminum support rafters are positioned along the sides of the canopy.

A canopy according to the present invention mounted on a vehicle provides shelter and protection when desired, and the canopy is easily stored in the enclosure for transport. The canopy provides shelter from the sun and other elements, whether on the beach or in the mountains, without setting up an independent structure or towing a camper trailer. The canopy may be mounted on nearly any vehicle having a luggage rack. Further, the canopy of the present invention is easily mounted on the vehicle, and is just as easily removed. In addition, the canopy can be mounted on the vehicle without destroying the vehicle's paint or surfaces, and without detracting from the vehicle's aerodynamic and aesthetic appeal.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
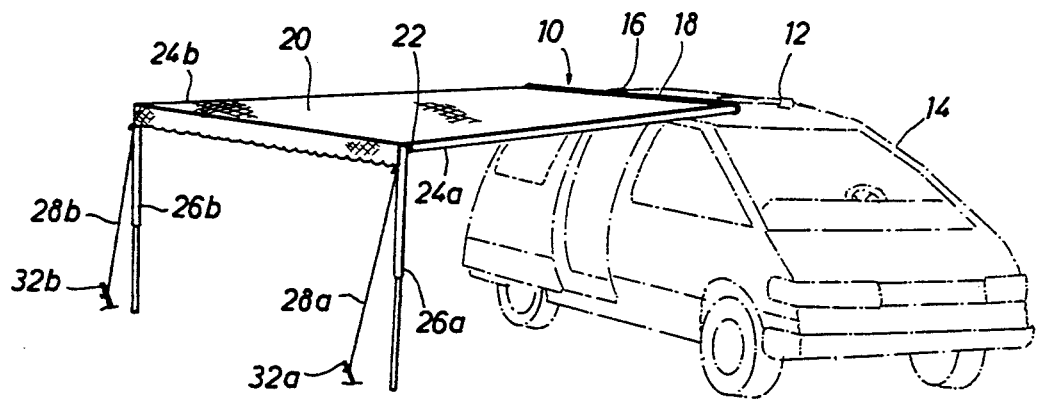
FIG. 1 shows a vehicle having a canopy assembly according to the present invention mounted on the luggage rack and fully extended and supported.

The preferred embodiment of a canopy assembly according to the present invention is shown in FIG. 1. As illustrated in FIG. 1, a canopy assembly 10 is mounted on a luggage rack 12 of a vehicle 14. The luggage rack 12 is a standard luggage rack that is commonly available as an option or accessory for many vehicles. Although the vehicle 14 depicted in FIG. 1 is a minivan, the vehicle 14 may be any van, minivan, utility vehicle or other suitable vehicle. The canopy assembly 10 includes an enclosure 16 having an opening 18 from which a canopy 20 extends. The canopy 20 is made from flexible plastic or cloth. In the preferred embodiment, the canopy 20 is composed of a waterproof plastic. As described below, the canopy 20 has one edge attached to the canopy assembly 10 inside the enclosure 16, which retains one edge of the canopy 20 when the canopy 20 is extended from the vehicle 14.

The canopy 20 includes a front rail 22 permanently connected to the leading edge of the canopy 20, which holds the canopy 20 rigid along the canopy edge parallel to the vehicle 14. The edges of the canopy 20 perpendicular to the vehicle 14 side are supported by aluminum rafters 24a, 24b. The aluminum rafters 24a, 24b are segmented, so that the rafters 24a, 24b may be extended with a telescoping action or separated into individual segments. In the preferred embodiment, the rafters 24a, 24b are extended with a telescoping action, and are twisted in relation to each other to lock the segments in place. The ends of the front rail 22 are supported by support posts 26a, 26b, which may similarly be extended with a telescoping action. The canopy 20 is further supported by ropes 28a, 28b connected to the support posts 26a, 26b and anchored in the ground with stakes 32a, 32b to hold the support posts 26a, 26b firmly to the ground.

Figure 2:
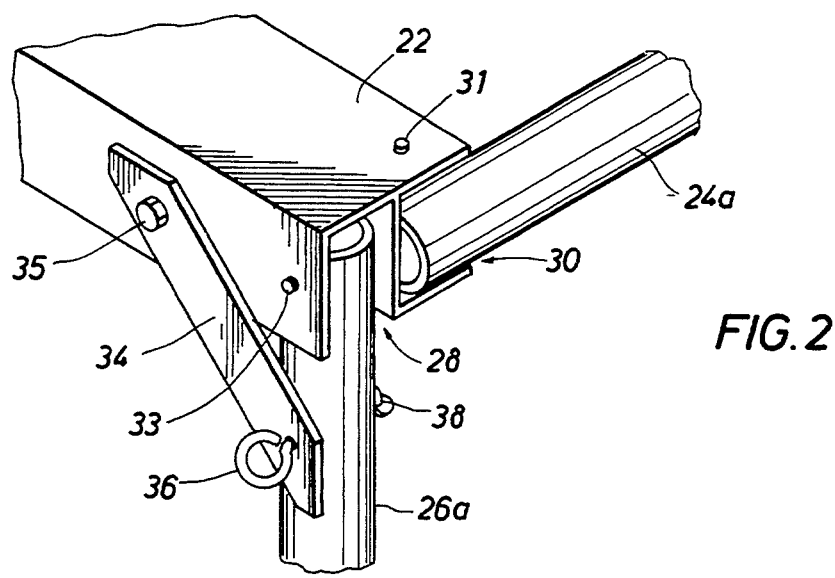
FIG. 2 shows a detailed view of the canopy corner of FIG. 1 where a front rail, rafter, and support post are joined.

One end of the front rail 22 is shown in detail in FIG. 2. The front rail is shown in FIG. 2 with the canopy 20 peeled away to expose the front rail 22. The front rail 22 is composed of extruded aluminum, and is attached to the rafter 24a and support post 26a. The front rail 22 includes two recesses 28, 30. The first recess 30 is open toward the vehicle, and the second recess 28 is open downward. The recesses 28, 30 receive the rafters 24a, 24b and support posts 26a, 26b when the canopy assembly 10 is dismantled for transport. The rafter 24a is mounted on a swivel 31 at the end of the front rail 22. When the rafter 24a is collapsed, the rafter 24a is swiveled so that it is parallel to the front rail 22 and are positioned in the recess 30 facing the vehicle 14. Similarly, in the preferred embodiment, the support post 26a is mounted on a swivel 33 at the end of the front rail 22 and folds into the downward facing recess 28 for transport like the rafter 24a. To support the support post 26a perpendicular to the front rail 22, a brace 34 is connected between the front rail 22 and the support post 26a about five inches from the junction of the support post 26a and the front rail 22. The brace 34 is connected by an eye bolt 36 and nut 38 at one end of the brace 34 after the support post 26a is extended. The rope 28a is looped through the eye of the eye bolt 36 to support the canopy 20. The other end of the brace 34 is connected to the front rail 22 with a standard bolt 35 and a nut (not shown).

Figure 3:
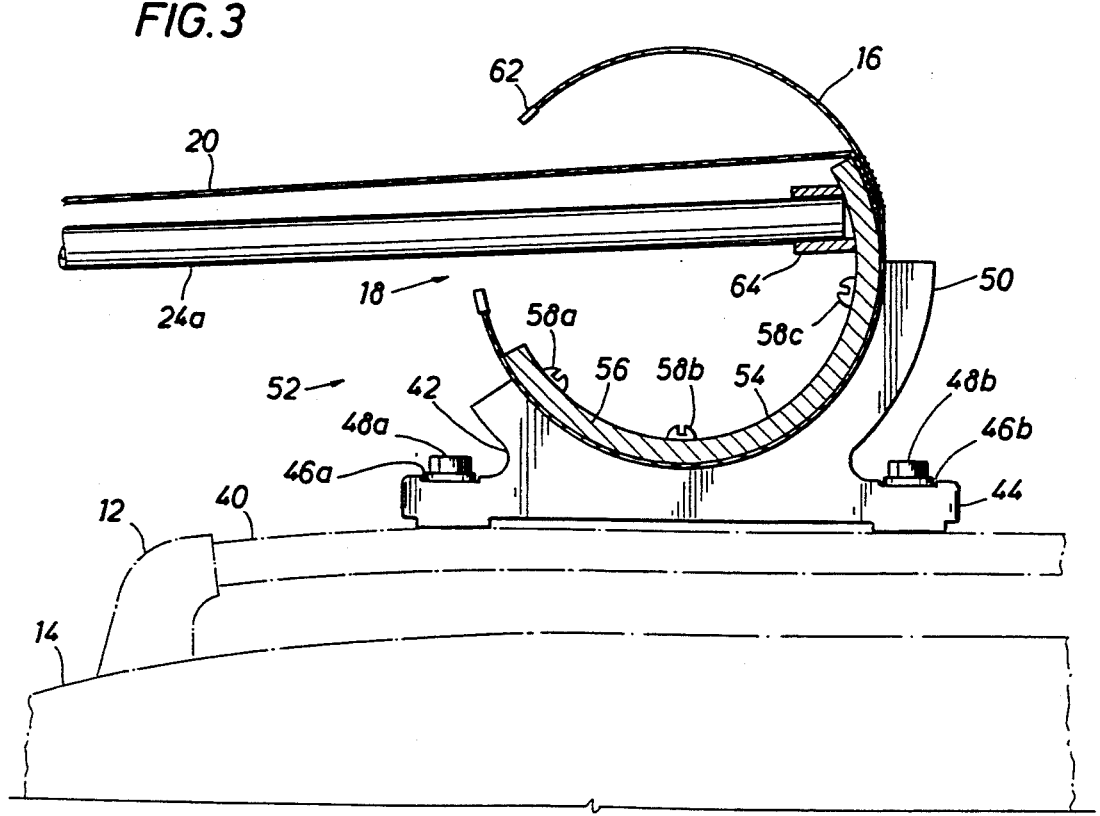
FIG. 3 is a front view of the canopy assembly of FIG. 1 with the enclosure partly cut away to expose the structure within the enclosure.

A closer view of the canopy assembly 10 is depicted in FIG. 3 from the front of the vehicle 14 and with the enclosure 16 partly cut away. The luggage rack 12 is mounted on the vehicle 14 conventionally. Like conventional luggage racks, it includes two cross bars 40 placed transversely across the roof of the vehicle, one of which is shown in FIG. 3. A bracket 42 is mounted on each cross bar 40. Each bracket 42 includes a base 44 having slotted ends 46a, 46b or holes. The slotted ends 46a, 46b of the bracket 42 are positioned over slots (not shown) formed along the length of the cross bars 40 of the luggage rack 12. A bolt 48a, 48b is threaded through each slotted end 46a, 46b of the bracket 42 and into the cross bar slots, and then fastened with a nut (not shown). Each end of the base 44 is raised to prevent the bracket 42 from slipping between the bolt 48a, 48b and the luggage rack 12. Many luggage racks include the slots pre-formed in the cross bars for bike racks and similar equipment. If the slots are not included in the luggage rack 12, the luggage rack 12 may be perforated and a threaded nut plate inserted with a rivet gun which receives the threaded bolts 48a, 48b.

Each bracket 42 further includes a cradle 50 positioned over the base 44. The side 52 of the cradle 50 nearest the side of the vehicle 14 is lower than the other side of the cradle 50. A carriage 54 and the enclosure 16 are mounted on a mounting surface 56 of the cradle 50 and held in place by three screws 58a, 58b, 58c. The enclosure 16 is positioned between the cradle 50 of the bracket 42 and the outer surface of the carriage 54. In the preferred embodiment, the enclosure 16 is a nylon bag having an opening 18 parallel to the side of the vehicle 14. The opening 18 is closed by a zipper 62, which provides access to the interior of the enclosure 16. One edge of the canopy 20 is sewn to the enclosure 16 so that the edge of the canopy 20 is retained when the canopy 20 is extended out of the enclosure 16 and away from the vehicle 14. The enclosure 16 is attached to the outer surface of the carriage 54 by an adhesive substance. In the preferred embodiment, the carriage 54 comprises a half section of polyvinyl chloride (PVC) pipe, split along its longitudinal axis. The carriage 54 is mounted on the mounting surface 56 of the cradle 50 at an angle so that the side 52 of the carriage 54 nearest the side of the vehicle 14 is lower than the side of the carriage 54 furthest from the side of the vehicle 14. The lower side of the carriage 54 and cradle 50 allow the canopy 20 to extend away from the vehicle 14 without draping over the carriage 54 or cradle 50.

To hold the rafters 24a, 24b in place, a rafter support 64 is positioned near each end of the carriage 54. In the preferred embodiment, the rafter support 64 is a small cup formed of PVC connected to the carriage 54 with an adhesive substance. The interior of the cup is pointed towards the side of the vehicle 14 so that the end of the rafter 24a may be fitted into the rafter support 64. The rafter support 64 braces the end of the rafter 24a so that the rafter 24a does not slip and cause the canopy 20 to sag or collapse.

Figure 4:
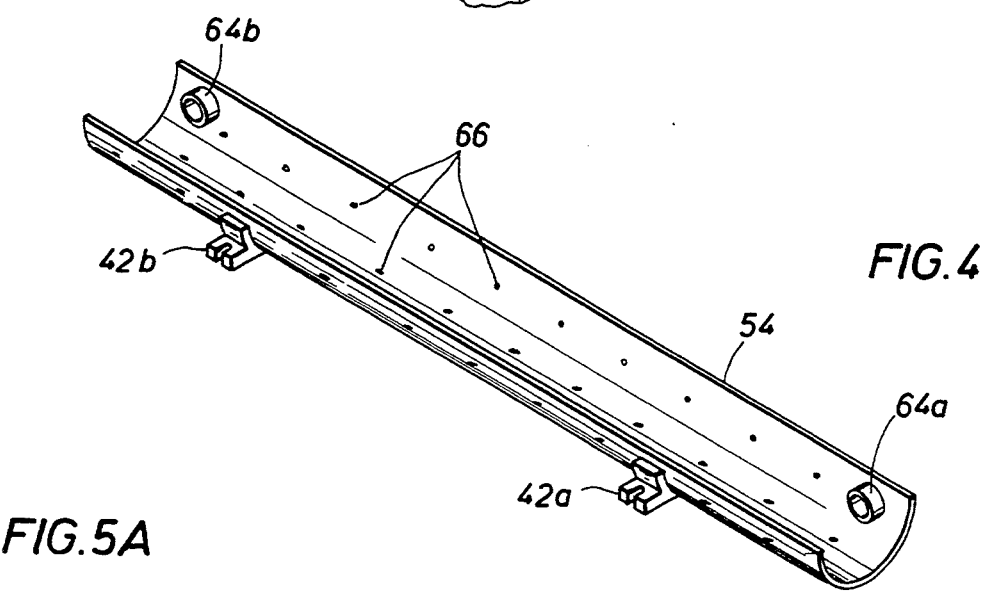
FIG. 4 is a view of the brackets and carriage without the enclosure.

Referring now to FIG. 4, the carriage 54 is shown mounted on the brackets 42a, 42b. In the preferred embodiment, the carriage 54 is contained within the enclosure 16, but for the purposes of illustration, the enclosure 16 is not shown. As depicted in FIG. 4, the carriage 54 includes an array of perforations 66, arranged in sets of three and set at regular intervals along the length of the carriage 54. Each set of three holes represents a potential position for mounting the carriage 54 on the brackets 42a, 42b cradle. The array of perforations 66 permits the canopy assembly 10 to be mounted on a luggage rack 12 regardless of the length of the vehicle's roof or the distance between the luggage rack cross bars 40. FIG. 4 also illustrates the positions of the two rafter supports 64a, 64b located near the ends of the carriage.

Figure 5A:
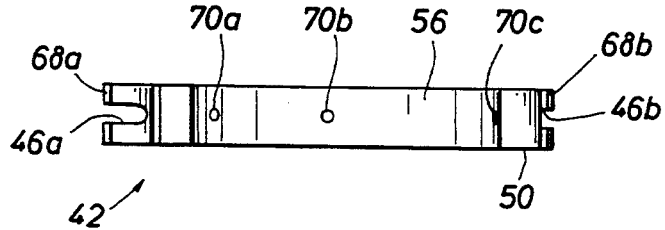
FIGS. 5A–5C illustrate top, front, and side views of the bracket, respectively.
Figure 5B:
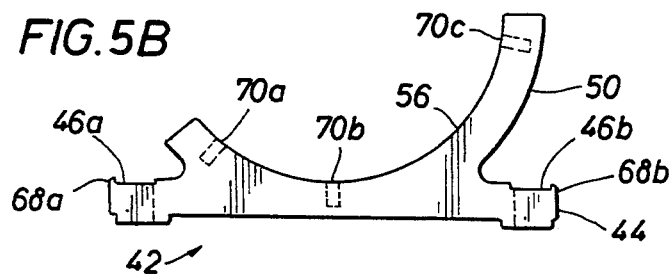
Figure 5C:
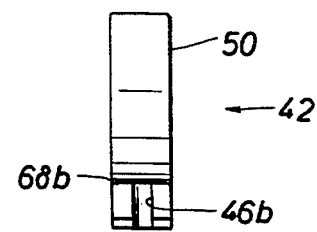

One of the brackets on which the carriage is mounted is shown in detail in FIGS. 5A–5C. In the preferred embodiment, the bracket 42 is composed of injection-molded plastic. The bracket 42 includes the base 44 having slotted ends 46a, 46b to receive the bolts 48a, 48b for mounting the bracket 42 on the luggage rack 12. The open-ended slots 46a, 46b allow easier installation of the canopy assembly 10 on the luggage rack 12 than simple holes. The raised ends 68a, 68b of the base 44 prevent lateral movement of the bracket 44 relative to the bolts 48a, 48b. Each bracket 42 also includes a cradle 50 having a mounting surface 56. The cradle 50 has three threaded holes 70a, 70b, 70c formed through the mounting surface 56 to receive the screws 58a, 58b, 58c for securing the carriage 54 to the bracket 42. The positions of these holes 70a, 70b, 70c correspond to the positions of the perforations 66 in the carriage 54.

While it is transported to its destination, the canopy assembly 10 of the preferred embodiment is mounted entirely on the luggage rack 12 of the vehicle 14. The nylon enclosure 16 is zipped closed to protect the canopy 20 and the various other components from the elements, and to prevent the canopy 20 and components from falling out of the enclosure 16 and damaging the vehicle 14 or the canopy assembly 10. When the destination is reached, the vehicle 14 is parked and the enclosure 16 unzipped. The front rail 22 attached to the edge of the canopy 20 is then pulled through the opening 18 of the enclosure 16 and the canopy 20 is unrolled. The support posts 26a, 26b are extended and the braces 34a, 34b are then connected between the front rail 22 and the support posts 26a, 26b. The rafters 24a, 24b are then extended and fitted into the rafter supports 64a, 64b in the carriage 54. To hold the canopy 20 to the ground, the tops of the support posts 26a, 26b are anchored by the ropes 28a, 28b and stakes 32a, 32b. The ropes 28a, 28b and stakes 32a, 32b prevent the canopy 20 from being caught and lifted by the wind.

To dismantle the canopy 20, the braces 34a, 34b are removed and the support posts 26a, 26b are freed from the anchor ropes 28a, 28b and stakes 32a, 32b. The rafters 24a, 24b are retracted to their collapsed state and folded into the front rail 22. The support posts 26a, 26b are then collapsed, and also folded into the front rail 22 of the canopy assembly 10. The canopy 10 is rolled around the front rail 22 and placed in the enclosure 16. Then the stakes 32a, 32b, ropes 28a, 28b, and braces 34a, 34b are placed on top of the canopy 20 within the enclosure 16, and the enclosure 16 is zipped closed.

Thus, a canopy assembly according to the present invention may be mounted on a minivan or utility vehicle without physically altering the vehicle itself. The canopy provides shelter and protection wherever it is needed, and is easily stored in its enclosure for transport. The canopy provides shelter from the elements without an independent structure or a camper trailer. The canopy assembly is easily mounted and removed from the vehicle, and is just as easily removed.

The foregoing disclosure and description of the invention are illustrative and explanatory of the invention, and various changes in the size, shape, and materials, as well as in the details of the illustrated construction and process may be made without departing from the spirit of the invention, all of which are contemplated as falling within the scope of the appended claims.

I claim:

1. An extendable shelter to be mounted on a luggage rack of a vehicle, comprising:
   a mounting bracket, including:
   a base, and
   a cradle positioned above said base, wherein said cradle includes a mounting surface;
   fastening means for fastening said base to the luggage rack;
   a carriage mounted on said mounting surface of said cradle, said carriage including a half-cylinder having an outer surface and an inner surface, wherein said outer surface abuts said mounting surface;
   an enclosure enclosing said carriage and connected to said carriage, wherein said enclosure includes access means for accessing the inside of said enclosure; and
   an extendable canopy having an edge secured within said enclosure, said canopy is extendable through said access means of said enclosure so that said edge of said canopy is retained within said enclosure when said canopy is extended.

2. The extendable shelter of claim 1, wherein said fastening means is detachable.

3. The extendable shelter of claim 2, wherein:
   said base includes a hole formed therethrough; and
   said fastening means includes a bolt received through said hole in said base.

4. The extendable shelter of claim 1, further comprising adjustable mounting means for mounting said carriage on said mounting surface of said cradle, wherein said mounting means may be adjusted with respect to said mounting surface.

5. The extendable shelter of claim 1, wherein:
   said cradle has a threaded hole formed through said mounting surface; and
   perforations formable through said carriage, wherein said perforations are positioned to correspond to said hole formed in said cradle at different locations on said carriage so that said hole formed in said cradle may be aligned with one of said perforations at different locations with respect to said carriage; and
   fastening means positioned through one of said perforations and threadably engaging said threaded cradle hole for fastening said carriage to said cradle.

* * * * *